United States Patent Office 3,781,258
Patented Dec. 25, 1973

3,781,258
POLYTETRAFLUOROETHYLENE POWDER AND
METHOD OF PREPARATION THEREOF
Yutaka Kometani, Sanda-shi, Shun Koizumi, Osaka, and Takeshi Suzuki, Takeaki Nakajima, and Chuzo Okuno, Settsu-shi, Japan, assignors to Daikin Kogyo Co., Ltd., Osaka, Japan
No Drawing. Continuation-in-part of application Ser. No. 456,551, May 17, 1965. This application Sept. 11, 1968, Ser. No. 759,218
Int. Cl. C08f 3/24, 47/02
U.S. Cl. 260—92.1        3 Claims

ABSTRACT OF THE DISCLOSURE

A method of preparing a polytetrafluoroethylene powder having good fluidity which comprises stirring at a temperature of 0–200° C. in the presence of water a composition consisting of one part by weight of a polytetrafluoroethylene powder the diameters of which particles are not more than 300 microns and 0.1–3.0 parts by weight of a water immiscible liquid having a boiling point 0–150° C. and capable of wetting polytetrafluoroethylene, the amount of said water being 1.5–50 parts by weight based on the composition.

---

This invention relates to a polytetrafluoroethylene powder whose fluidity is good and which moreover is capable of being molded completely. The invention also relates to a method of preparing such a polytetrafluoroethylene powder. This application is a continuation-in-part application of the copending Ser. No. 456,551, filed May 17, 1965.

In addition, the invention relates to a filler-incorporated polytetrafluoroethylene powder whose fluidity is good and which moreover is capable of being molded compactly and to a method of preparing such a powder wherein the filler is uniformly admixed in said powder.

The method of molding polytetrafluoroethylene differs from that used in molding the other thermoplastic resins, such as melt-extrusion molding, melt-injection molding and hot compression method, in that it is a method similar to that of powder metallurgy. Thus, the molding powder of polytetrafluoroethylene is required to possess a number of special characteristics. For example, first, it must have good fluidity. Secondly, the individual powder particles must be of such softness that they will readily adhere to each other at a pressure of above 50 kg./cm.$^2$ and thirdly, the bulk density of the powder must be high. The first is a characteristic which is demanded of the powder in connection with its handling. If a powder possesses good fluidity and does not aggregate, there is the effect that the filling of a mold can be accomplished uniformly and readily. Further, that the fluidity is good is an indispensable requirement when the molding is to be by means of an automatic molding apparatus. With respect to the second characteristic, if the surfaces of the powder particles do not adhere to each other closely, voids would occur in the sintered shaped articles and hence compact shaped articles cannot be obtained. Further, the particles must adhere readily to each other with a pressure of about 50 kg./cm.$^2$ When the particles are either hard or have a nonuniform hardness, the mutual adherence of the particle by means of pressure becomes unsatisfactory. The third characteristic is not necessarily an absolute requirement, but in the case, say, when thin shaped articles are to be made, it is preferred that the powder be one of small bulk density. Generally speaking however, in forming a shaped article of identical configuration, a smaller mold can be employed with a powder whose bulk density is high. For example, when forming identical cylinders from powders having bulk densities of 0.25 and 0.5, in the case of the latter a mold about half the size will suffice, thus making it more convenient.

When the powders which have been investigated or have been commercially available hitherto are considered, although there are some polytetrafluoroethylene powders which have relatively good fluidity and high bulk density, i.e., those which possess to a somewhat satisfactory degree, though not fully, the hereinbefore mentioned first and third characteristics, the particles of these powders are hard and do not possess the second characteristic mentioned above and hence it is only possible to obtain products containing many voids by their use. Further, the polytetrafluoroethylene powder containing a major portion of fibrous particles and having a particle size of less than 50 microns, a shape factor of 5–12 and an anisotropic expansion factor of 1.16–1.28, as disclosed in U.S. Pat. 2,936,301, does not possess the aforementioned first and third characteristics, since its fluidity is unsatisfactory owing to the minute and fibrous character of its particles and also since its bulk density is a low value of not more than 0.3.

Further, when the molding powders which are generally available commercially are observed under a microscope, these powders exhibit a very complicated exterior, abounding in unevenness, and the particles usually seem to have fibrous beardlike projections emerging from their surfaces. Powders of this sort likewise possess the defect that their fluidity is poor. Thus, it is a fact that a polytetrafluoroethylene molding powder possessing, in combination, the three aforementioned characteristics has not been made available as yet. This likewise is true with the filler-incorporated polytetrafluoroethylene powder. In the case of a filler-incorporated polytetrafluoroethylene powder, it is of course required that the filler is intimately mixed with the polytetrafluoroethylene particles.

It is therefore an object of the present invention to provide an easily handled polytetrafluoroethylene powder having good fluidity whose particles can be readily made to adhere to each other by means of pressure, with the consequence that compact shaped articles can be obtained therefrom. Another object is to provide a polytetrafluoroethylene powder wherein is intimately mixed a filler, which possesses properties identical to those of the hereinabove-described polytetrafluoroethylene powder.

Other object of the invention will be apparent from the following description.

We found that the foregoing objects of the present invention could be achieved by preparing a mixture consisting of a polytetrafluoroethylene powder whose particle size is less than 300 microns and a liquid capable of wetting polytetrafluoroethylene and having a boiling point of 0–150° C., and preferably 30–100° C., and heating with stirring this mixture, as obtained, or if necessary, after adding water thereto.

The granular polytetrafluoroethylene of the present invention, so obtained, has a bulk density of not less than 0.4 and an angle of repose of not more than 45 degrees and is made up of secondary particles of a diameter not more than 5000 microns which consist of primary particles of not more than 300 microns uniformly aggregated, the content of pearly particles being in a relatively great amount (above about 10% by number). A film formed from this powder not containing a filler is characterized in that the film exhibits a vapor permeability of not more than 5.0 g./m.$^2$·24 hr.

The terms "angle of repose" and "vapor permeability," as used herein, have the following definitions, their respective values being determined as follows:

The measurement of the angle of repose is carried out in the following manner. A stainless steel funnel 40 mm. in height and having an inside diameter at the top of 40 mm. and at the bottom of 8 mm. and provided in its outlet with an orifice 3 mm. in length and an inside diameter of 8 mm. is located 20 mm. above the floor. The powder to be measured is passed gently through this funnel. The powder piles up on the floor and finally the tip of the pile comes in contact with the outlet of the funnel. Since the powder piles up in nearly a concidal shape, the radius $r$ of the base thereof is measured and the angle of repose is obtained by means of the following equation.

Angle of repose $\theta = \tan^{-1}(20/r)$

In carrying out this measurement of the angle of repose the powder to be measured must be thoroughly eliminated of its moisture in advance and its static charge must also be removed. In addition, the measurement must be performed at 23° C. Unless otherwise noted, all percentages used herein are on a weight basis.

The vapor permeability is determined in the following manner. Three hundred grams of the powder to be measured is preformed in a mold having an inside diameter of 70 mm. under a pressure of 300 kg./cm.$^2$, after which the preformed product is placed in a stirrer-equipped electric furnace and the temperature of the furnace is raised to 370° C. at the rate of 150° C. per hour. The product is sintered for 8 hours at 370° C. and then cooled to room temperature at the rate of 40° C. per hour. From the so obtained block whose diameter is about 70 mm. and height is about 80 mm., a 0.1-mm. tape is shaved with a lathe. This tape is then tested for its vapor permeability at 40° C. in accordance with the procedure of JIS Z-0208, the measured value being expressed in terms of the unit g./m.$^2 \cdot$24 hr.

The polytetrafluoroethylene powder of the present invention is featured in that the presence can be observed by means of an optical microscope of not less than 20 powers, of at least about 10% of pearly particles of relatively simple exterior having a surface of few unevenness as compared with the conventional powders; in that its angle of repose is less than 45 degrees, and in that the specific surface area as determined from the amount of nitrogen adsorption in accordance with the BET method is 2–6 m.$^2$/g. in the case of a powder not incorporated with a filler. When the particle diameters are determined by the wet sieve size using carbon tetrachloride as the washing and screening agent, the range is 100–5000 microns, and particularly 200–2500 microns. On the other hand, when determined by the air permeability method, the particle diameters are 2–10 microns. Another feature is that a greater part of this granular powder consists of secondary aggregates, i.e., grandulated products, of primary particles having an average particle diameter of not more than 300 microns, and preferably not more than 200 microns, and have a high bulk density of at least 0.4. Moreover, the shaped articles obtained therefrom are compact and voidless, the vapor permeability being not more than 5.0 g./m.$^2 \cdot$24 hr. in the case of the powder not incorporated with a filler.

What is meant by the liquid "wetting" the polytetrafluoroethylene powder is that the liquid readily penetrates the major part of the interstices or gaps in said powder. For instance, when the liquid is water and cannot penetrate the interstices or gaps but remains in a standstill state, the polytetrafluoroethylene powder usually floats on the surface of the water. In such a case, it is concluded that the liquid is not wetting the polytetrafluoroethylene powder. Empirically, a liquid having a surface tension of not more than 35 dyne/cm. at 25° C. can easily wet the polytetrafluoroethylene powder. Examples of such a liquid include the aliphatic hydro carbons such as hexane, heptane, gasoline and kerosene; aromatic hydrocarbons such as benzene, toluene, and xylene; alcohols such as ethyl and methyl alcohol, isopropanol, tertiary butanol, allyl alcohol, ethylene glycol, benzyl alcohol and cyclohexanol; ethers such as ethyl ether, anisole, tetrahydrofuran and dioxane; aldehydes such as paraldehyde, acetal and acrolein; ketones such as acetone, cyclohexanone and methyl ethyl ketone; halogen derivatives such as chloroform, carbon tetrachloride, aryl iodide, ethylene dibromide, chloral, dichloroacetic acid, acetyl chloride, monochlorobenzene and benzyl chloride; fluoric derivatives such as trichlorotrifluoroethane, monofluorotrichloroethane, difluorotetrachloroethane, octafluorocyclobutane, $Cl(CF_2CFCl)_nCl$, $H(CF_2CF_2)_nCH_2OH$, $$Cl(CF_2)_nCl$$

(in which three foregoing formulas, the $n$ is an integer 1–10), omega-monohydroperfluorohexane, benzotrifluoride, monobenzotrifluoride, dibromotetraruoroethane and trichloropentafluoropropane.

In the case of carrying out the granulation operation of the present invention in the presence of a relatively large quantity of water, a liquid to be used should be water-immiscible in addition to the requirements that it should have a surface tension of not more than 35 dyne/cm. and it should have a boiling point in the range of 30 to 150° C. Typical examples of the liquid usable in the invention are aliphatic hydrocarbons such as hexane, heptane, gasoline and kerosene, or mixtures thereof, aromatic hydrocarbons such as benzene, toluene and xylene, ethers such as anisole and tetrahydrofuran, halogen derivatives such as trichlene, carbon tetrachloride, aryl iodide, ethylene dibromide, monochlorobenzene and benzyl chloride, and fluoro derivatives such as trichlorotrifluoroethane, monofluorotrichloromethane, difluorotetrachloroethane, octafluorocyclobutane, $Cl(CF_2CFCl)_nCl$, $H(CF_2CF_2)_nCH_2OH$, $Cl(CF_2CFCl)_nCl$ (in these three formulae, $n$ is an integer of 1–5), omega-monohydroperfluorohexene, benzotrifluoride, monobenzotrifluoride dibromotetrafluoroethane and trichloropentafluoropropane.

The compactness of the shaped articles made from the invention polytetrafluoroethylene granular powder is not only proved by the aforesaid vapor permeability, but is also substantiated by the fact hardly any voids are visible when thin piece on the order of 10 microns shaved from a formed block by means of a microtome are observed with an optical microscope of above 100 powers and the fact that when the dielectric breakdown voltages of films under the conditions indicated in Example 3 were measured, values ranging between 6,000 v./0.1 mm.–13,000 v./0.1 mm. were obtained, the arithmetic average of more than 40 pieces being above 9,000 v./0.1 mm.

Extensive experiments concerning the polytetrafluoroethylene powder have led to the discovery that in order to carry out the filling of the powder into the mold and its compression without any difficulty whatsoever during the manual or automatic molding of the powder, it was necessary that the angle of repose of the powder be not more than 45 degrees, an angle of not more than 40 degrees being particularly to be preferred. Further, as hereinafter described, it was found that the powders obtained by the various prior art processes had in all cases, an angle of repose of above 45 degrees, and thus that either nonflowing of the powder would occur due to the undesirable bridging phenomenon of the powder during its molding, and especially during its molding by means of an automatic molder, or that nonuniform filling of the molds would occur.

As previously indicated, the polytetrafluoroethylene powder for molding use preferably should have a bulk density of at least 0.4. For obtaining powders of high bulk density by means of the prior art processes, either the process in which coarse particles obtained by polymerizing under specified conditions were pulverized by means of a suitable grinder under coarse grinding conditions or a process in which a polymer-water slurry was cut under coarse conditions using a mixture was employed. Hence, the hard core or nucleus present in the coarse particles of the polymer remains therein without being subjected to any pulverizing or fine splitting action, with the consequence that the pulverized powder obtained is hard, does not fuse together during the molding, and only porous shaped articles having numerous voids can be obtained therefrom. Consequently, there did not exist by means of the prior art processes polytetrafluoroethylene which had a bulk density of at least 0.4 and would yield compact shaped articles.

We found that the polytetrafluoroethylene granular powder having a bulk density of at least 0.4 and an angle of repose of less than 45 degrees and which moreover would yield compact shaped articles could be obtained by grinding the coarse particles of the polymer to an average particle diameter of not more than 300 microns, and preferably not more than 200 microns, by means of a comminuting grinder, as used in the hereinafter, given Example 1, such as the Micron Mill, Ultramizer, Hurricane Mill and Jet-O-Mizer and then carrying out the secondary granulation of the so ground powder. When described more specifically, the procedure is as follows:

A polymeric powder obtained either by polymerizing tetrafluoroethylene in the presence of water containing a reaction initiator or by subjecting tetrafluoroethylene in its vapor or liquid phase to an ionizing radiation is, in its dry state or in the presence of water, rendered into a granular powder of an average particle diameter or not more than 300 microns by means of a grinder such as a hammer mill, a grinder having a rotor equipped with vanes, a fluid energy type of grinder, or a cutting blade. While the form of this granular powder may be either fibrous or nonfibrous, the important point is that its average particle diameter is not more than 300 microns, preferably not more than 200 microns.

Next, to this granular powder of not more than 300 microns is added a liquid having a surface tension of not more than 35 dynes/cm. at 25° C., i.e., a liqiud capable of wetting the polytetrafluoroethylene. The foregoing liquids, which are either used singly or as a mixture of two or more thereof, are added in an amount of 0.1–3 parts to one part of the polytetrafluoroethylene to form either a slurry or a mixture wherein the latter is wetted by the former. The filler, if necessary, is added together at this time. When the amount of the liquid is either less than 0.1 part of about 3.0 parts to one part of the polytetrafluoroethylene powder, a perfect granular product cannot be obtained in the granulation step which follows.

When water is not used or used only in a small amount in granulation, the so obtained mixture of the liquid and the polytetrafluoroethylene powder or filler-incorporated polytetrafluoroethylene powder is stirred at a temperature in a range of from 30 to 150° C., the choice being made in consideration of mainly the boiling point of the liquid used. As a more preferred method, the heating is started at a temperature below the boiling point of the liquid, which is then gradually raised to near the boiling point, the stirring being continued during this time. As a result of the stirring, the mixture of the liquid and the polytetrafluoroethylene powder or filler-incorporated polytetrafluoroethylene powder is dispersed in sizes ranging from 100 to 5000 microns. As the temperature approaches to the boiling point of the liquid, the liquid separates from the polytetrafluoroethylene or filler-incorporated polytetrafluoroethylene powder to be completely eliminated finally by evaporation, with the consequence that what remains is a polytetrafluoroethylene or filler-incorporated polytetrafluoroethylene powder which has been granulated to particle sizes ranging from 100 to 5000 microns. Upon complete elimination of the liquid, the stirring is stopped, the powder is dried to obtain the intended granulated polytetrafluoroethylene or filler-incorporated polytetrafluoroethylene powder. This granulation step can also be carried out under superatmospheric or reduced pressure. When carried out under superatmospheric pressure, since the boiling point of the liquid generally rises, the operation can be carried out at a higher temperature than at atmospheric pressure.

The most suitable types of apparatus used in this operation are the fixed vessel type mixer or the rotating vessel type mixer or the rotating vessel type mixer or blender. Generally speaking, the rotating type of mixer, for example, the V- or the C-type blender, or these with which a stirrer has been combined can be used conveniently. Further, the fluidizing type of mixer can also be used with some modifications. In addition, the granulation of the slurried powder can also be carried out by placing it on screen and blowing a stream of air from the underside of the screen, thus cutting the slurried powder finely and at the same time tumbling it to effect its granulation. For this purpose, the use of the commercially available fluid layer dryer, an apparatus of this sort, can be considered. Again, under certain circumstances, the granulation can be effected by dividing the slurry in advance with a mixer, in the presence of water, followed by putting the slurry through the previously described rotating type of mixer to impart a tumbling action to the divided slurry. As the blender, the commercially available vertical or horizontal blender can also be utilized. It is prefered that these apparatuses, in all cases, have a heating means.

When the granulation operation is carried out by using a relatively large amount of water, that is, when one part by weight of a mixture of polytetrafluoroethylene powder and a liquid capable of wetting the powder is granulated while stirring in 1.5–50 parts by weight of water, the used liquid should be water-immisible, as mentioned before. In this operation, a mixture of the polytetrafluoroethylene and liquid is put into water, and then stirred. It is however not always necessary to mix them with each other before putting into water, but both of them may be separately put into water being stirred. If the amount of water is below 1.5 parts by weight against one part by weight of the said mixture, the stirring operation becomes difficult, and it is difficult to effect the granulation. Even if the amount of water is very large, granulation can be effected, but if it exceeds 50 parts by weight, the operation is uneconomical because of loss of energy for stirring or rise in the cost of water.

Furthermore, when water is used in such a large amount, the stirring operation need be effected at a high speed. If the speed is too low, the size of granules becomes excessively large and is unsuitable for the powder of the invention. As the speed gets larger, the size of granules becomes smaller. When the speed of stirring is relatively fast, granulation is effected if stirring is conducted for more than one minute. To conduct a sufficient granulation, it is preferable in most cases to carry out stirring for at least two minutes. It has been found that a longer time for granulation leads to a larger apparent density of the resulting powder and an improvement in the smoothness of the particle surface, but that when the granulation is continued for more than 15 minutes, there is hardly any appreciable improvement in these properties. The treating temperature is 0–200° C., preferably 0–100° C., but it is generally preferable to effect the granulation at a temperature in the vicinity of room temperature.

Another procedure, under certain circumstances, is that of carrying out the granulation by dividing the powder first with a mixer in the presence of water, then raising the temperature with stirring using a suitable stirrer to eliminate the liquid by evaporation.

Generally, the fluidity of the obtained powder is improved more as the granulation temperature gets higher, but on the other hand, this leads to some deterioration in the density of articles shaped from the powder.

The granulation operation can be effected both at an elevated and reduced pressure. When it is effected at an elevated pressure, it is possible to operate at a temperature higher than that under normal atmospheric pressure since the boiling point of a slurrying agent generally rises. Furthermore, since pressure is exerted onto the slurry of the polytetrafluoroethylene powder dispersed in water, the obtained particles are more solid than those obtained by the same procedure carried out under atmospheric pressure.

When granulation is effected by stirring the materials in a relatively large amount of water, a vessel equipped with a stirrer can be used with good results. In this case, generally speaking, good results are not obtained by rotating at a low speed a stirrer having anchor type vanes. As the mixer type stirrer divides the powder into suitable particle sizes, it generally yields a good granulated powder and it is especially suitable for obtaining a powder whose range of particle size distribution is narrow. It is important that this stirrer should have an ability of vertical stirring, and of cutting the dispersed material. The commercially available stirrers such as those having propeller vanes, flat vanes, flat vanes with a 45-degree pitch or curved vanes with or without a pitch, the spiral ribbon stirrer, the comb type stirrer, and cone type stirrer with baffles can generally be used satisfactorily either without modification or, at most with a slight modification.

The water and organic solvents used in practicing the present invention need not necessarily be purified to high purity. However, if those containing inorganic or organic impurities are used, these remain in the resulting polytetrafluoroethylene powder to become causes of undesirable discoloration of the shaped articles and lowering of the breakdown voltage. Hence, it is necessary to eliminate in advance from the dispersion and water these impurities which become the causes of such troubles.

In order to illustrate further the invention, the following examples of the principal modes of practicing the invention are given.

EXAMPLE 1

Tetrafluoroethylene was polymerized in the water phase containing a free radical reaction initiator, after which the polymer was separated and dried to yield a crude powder of polytetrafluoroethylene. The so obtained powder was ground using a 3 H.P. Ultramizer (product of Fuji Denki Kogyo Company, Japan), a 3 H.P. Micron Mill (product of Hosokawa Tekkojo, Ltd., Japan) and a 1 H.P. Sample Mill (product of Fuji Denki Kogyo Company, Japan). The grinding conditions and the properties of the resulting powder are shown in Table I along with a commercially available grade powder.

A granulation experiment was then conducted by operating as described hereinafter, using the several types of powders given in Table I. A mixture of polytetrafluoroethylene and carbon tetrachloride was prepared by adding as the liquid 45 g. of commercially available carbon tetrachloride equivalent to a grade 1 reagent to 40 g. of the polytetrafluoroethylene powder. The mixture was then stirred for 2 minutes at room temperature together with 300 cc. of an ion exchanged water, using a commercially available mixer. Next, the mixture along with the water was transferred to a round-bottomed beaker 90 mm. in diameter and 15 mm. high, where the temperature of the mixture was raised to 80° C. at the rate of 1° C. per minute while continuing the stirring thereof with a 2-bladed propeller stirrer rotating at 600 r.p.m. The carbon tetrachloride began to be eliminated externally of the system by evaporation from about 60° C. At 80° C., it was completely eliminated and the powder rose to the surface of the water. The stirring was then stopped and the powder was separated from the water and dried.

When the granulated powder obtained by the above operation was observed under a microscope at 20 powers, it was found that when the materials given in Table I were used, in all cases excepting sample D, the resulting powders contained a major proportion of pearly particles of relatively simple exterior with substantially no beard-like projections. Further, when the properties of the several powders were tested, it was found that they possessed many excellent properties, as compared with the commercially available grade of powder having a bulk density of 0.55. These results are shown in Table II.

As can be seen from Tables I and II, the intended granulated polytetrafluoroethylene can be readily obtained by the invention method so long as the particle size is not more than 300 microns regardless of the form of the material powder.

EXAMPLE 2

When experiments were conducted using the sample A powder of the aforesaid Table I but by varying the class of the liquid and the granulating conditions used, granulated powders of the several modes, as presented in Table III, were obtained.

Elaborating further regarding Table III, the amount of the starting material powder, in all cases, was 40 g. The amount of the liquid used was of the same amount, while the amount of water used was 10 parts to 1 part of the powder. In Experiments 10 and 12, the mixture of the polytetrafluoroethylene and liquid was stirred in advance, as in Example 1, along with the water. On the other hand, in Experiments 7, 8, 9 and 11, this operation was not performed. The maximum r.p.m. during the operation is given in all cases.

The particles of the granulated powder obtained by operating as in Experiment 12 was somewhat softer than those obtained by operating as in the other experiments. Thus, it was observed that the particles becomes friable upon being subjected to a strong vibration. On the other hand, the particles of the powder obtained under the conditions of Experiment 9 were large and hence not suitable as the intended product of the present invention.

TABLE I

| | Grinding conditions | | | Properties of the powder | | | |
|---|---|---|---|---|---|---|---|
| Sample | Apparatus employed | R.p.m. of main shaft | Classifier | Particle size, microns | Bulk density | Angle of repose, degrees | Shape of particles |
| A | Ultramizer | 9,000 | Centrifugal | 15 | 0.25 | 47 | Nonfibrous. |
| B | Micron mill | 5,000 | Basket | 30 | 0.20 | 50 | Fibrous. |
| C | Jet-O-Mizer | | | 25 | 0.25 | 48 | Nonfibrous. |
| D | Sample mill | 3,000 | No | 500 | 0.30 | 50 | Do. |
| E [1] | | | | 150 | 0.25 | 47 | Do. |

[1] Commercially available grade polytetrafluoroethylene.

TABLE II

| | | Properties of the granulated powder | | | | Properties of the shaped article | | |
|---|---|---|---|---|---|---|---|---|
| Experiment | Sample | Bulk density | Particle size, microns | Angle of repose, degrees | Specific surface area by nitrogen adsorption, m.$^2$/g. | Vapor permeability, g./m.$^2$.24 hrs. | Tensile strength, kg./mm.$^2$ | Elongation, percent |
| 1 | A | 0.70 | 600 | 37 | 4.2 | 1.2 | 2.3 | 300 |
| 2 | B | 0.69 | 650 | 35 | 4.1 | 1.5 | 2.4 | 280 |
| 3 | C | 0.68 | 580 | 36 | 3.8 | 0.9 | 2.3 | 310 |
| 4 | D | 0.40 | 500 | 50 | 2.1 | 3.0 | 2.5 | 250 |
| 5 | E | 0.65 | 630 | 37 | 2.5 | 1.0 | 2.3 | 270 |
| 6 | [1] | 0.55 | 500 | 50 | 1.5 | 3.5 | 2.0 | 230 |

[1] Commercially available grade polytetrafluoroethylene having a bulk density of 0.55.

TABLE III

| Experiment | Liquid | Vessel dimensions diameter and Height, mm. | Type of stirrer | R.p.m. | Temperature raised, °C. | Bulk density | Particle size, microns | Angle of repose, degrees | Vapor permeability, g./m.².24 hrs. | Tensile strength, kg./mm.² | Elongation, percent |
|---|---|---|---|---|---|---|---|---|---|---|---|
| 7 | Carbon tetrachloride. | 90 x 150 | 2-bladed propeller. | 200 | 85 | 0.71 | 2,000 | 31 | 3.0 | 2.3 | 280 |
| 8 | do | 90 x 150 | 6-bladed flat vane. | 600 | 85 | 0.68 | 750 | 32 | 1.0 | 2.5 | 270 |
| 9 | do | 90 x 150 | Anchor type. | 600 | 85 | 0.80 | 10,000-20,000 | | | | |
| 10 | Trichloroethylene. | 90 x 150 | 2-bladed propeller. | 600 | 95 | 0.72 | 550 | 36 | 0.9 | 2.3 | 290 |
| 11 | do | 90 x 150 | 6-bladed flat vane. | 600 | 95 | 0.70 | 700 | 33 | 1.2 | 2.5 | 260 |
| 12 | Trichlorotrifluoroethane. | 90 x 150 | 2-bladed propeller. | 600 | 45 | 0.57 | 680 | 35 | 1.0 | 2.5 | 250 |

EXAMPLE 3

Fifty grams each of the granulated polytetrafluoroethyl powders listed under Experiments 1 and 2 in Table II were preformed under a pressure of 300 kg./cm.² in molds 30 mm. in inside diameter. The molds were then placed in an electric furnace and the temperature was raised from 100° C. to 370° C. at the rate of 96° C. per hour. After maintaining the temperature of 370° C. for 8 hours, the temperature was gradually reduced to 240° C. at the rate of 48° C. per hour. Then, after turning off the power to the oven, the temperature was allowed to fall to below 100° C. From the so obtained cylindrical shaped articles, tapes having a thickness of 0.1 mm. were shaved with a lathe. When these tapes were measured for their dielectric breakdown voltage in air in accordance with JIS K 6887–1963, both the tapes of Experiments 1 and 2 exhibited an average of 11,000 volts. When the same test was performed on samples A and B given in Table I, above, the dielectric breakdown voltage of both also averaged 11,000 volts. Thus, it can be seen from these results that the desirable properties of the starting material powder have not been lost during the granulation step.

EXAMPLE 4

Seven kg. of granulated polytetrafluoroethylene powder having a bulk density of 0.70 and an average particle diameter of 630 microns were obtained by using as the starting material the powder indicated as sample A in Example 1, as the slurrying agent carbon tetrachloride and as the vessel a 100-liter vessel equipped with a jacket and a 6-bladed flat vane stirrer. The other properties of this granulated product were substantially similar to those of the product obtained in Experiment 1 in Table II.

Using as a control the conventional commercially available polytetrafluoroethylene powder having a bulk density of 0.55, the powder obtained as hereinabove described was subjected to an extrusion test using a ram extruder having an inside diameter of 22 mm., a heater zone of 630 mm. and a filling length of 40 mm., under the conditions of a plunger pressure of 55 kg./cm.² and a sintering temperature of 380° C., at the rate of 43 seconds per cycle. Although the extrusion speed of the granulated polytetrafluoroethylene powder of this example was 1.3 times that of the commercially available product, the strength of the former was 2.35 kg./cm.² as compared with the 2.00 kg./cm. for the latter. Further, according to the results of observation by means of a microscope of a thin piece shaved from the shaped article with a microtome, there could be seen no voids at all in the product formed from the granulated polytetrafluoroethylene powder of this example.

EXAMPLE 5

The sample A powder of Table I, above, was used and experiments were carried out, varying the class of liquids used and the conditions of granulation, whereby were obtained the several modes of granulated powders, as presented in Table IV.

Elaborating further regarding Table IV, the amounts of powder used were 500 g. and the liquid were added in a ratio of 0.5–1 part to said powder. Of the apparatuses used, the V-blender was one having a capacity of 10 liters, which was rotated at 35 r.p.m. The heating was carried out by directly applying steam against the blender from the outside. The kneader was of the commercially available type equipped with a jacket and having a capacity of 5 liters, the r.p.m. of which was 140.

The fluid layer dryer was of the commercially available type for laboratory use, which was used without modification. The principle involved being that the slurry is tumbled above a wire cloth while being dried by blowing up hot air of 60° C. from below the wire cloth.

In Experiment 16, a mixture of the polytetrafluoroethylene powder and carbon tetrachloride which was finely cut in advance for 2 minutes in a mixer in the presence together of 30 g. of water was used.

The granulated powders obtained by the hereinabove described procedures were suitable as the intended products of the present invention.

TABLE IV

| Experiment | Class of liquid | Apparatus used | Temperature, °C. | Bulk density | Particle size, microns | Angle of repose, degrees | Vapor permeability, g./m.².24 hr. | Tensile strength, kg./mm.² | Elongation, percent |
|---|---|---|---|---|---|---|---|---|---|
| 13 | Acetone | V-blender | 40 | 0.6 | 750 | 32 | 3.0 | 2.3 | 280 |
| 14 | Carbon tetrachloride | do | 40 | 0.63 | 550 | 36 | 1.0 | 2.5 | 270 |
| 15 | Trichlorotrifluoroethane | Kneader | 40 | 0.58 | 700 | 33 | 0.9 | 2.3 | 290 |
| 16 | Carbon tetrachloride | Fluid layer dryer | 60 | 0.68 | 680 | 35 | 1.2 | 2.4 | 260 |

EXAMPLE 6

As the polytetrafluoroethylene were chosen the commercially available molding powders having particle diameters of (a) 35 microns, (b) 150 microns and (c) 450 microns, and an aqueous dispersion containing 30% by weight of polytetrafluoroethylene having an average particle diameter of 0.2 micron.

The classes and amounts of fillers, which were admixed, are shown in Table V. The mixing of the filler and the polytetrafluoroethylene powder in powders A, B, C, D and E was accomplished with a flash mixer. In the case of powder F, the glass powder was mixed in a prescribed amount of the aqueous dispersion and then the polytetrafluoroethylene was aggregated from said dispersion in customary manner. The glass powder was mixed in substantially uniformly.

The granulation experiment was then carried out by treating the polytetrafluoroethylenes incorporated with these fillers, in accordance with the conditions shown in Table VI.

TABLE V

| Powder | Material powder | Class of filler | Amount of filler percent |
|---|---|---|---|
| A | (a) | Glass powder | 20 |
| B | (a) | Molybdenum disulfide | 20 |
| C | (b) | Fibrous glass powder | 20 |
| D | (b) | Graphite powder | 20 |
| E | (c) | Glass powder | 20 |
| F | (d) | Fibrous glass powder | 20 |

The properties of the so obtained granulated filler-incorporated polytetrafluoroethylene powders and the property of the shaped articles molded from these powders are shown together in Table VI. It was shown by these experiments that whereas the powders obtained by Experiments 17, 18, 19, 20, 21, 23 and 24 were in conformance with the objective of the present invention, the powder obtained by Experiment 22 not only did not granulate but the filler also was not uniformly mixed in the powder. When observed under a microscope, it was shown that all of the powders, except that of Experiment 22, contained a major proportion of pearly particles having a relatively simple exterior substantially no beardlike projections.

TABLE VI

| Experiment | Powder | Granulating conditions | | | | Properties of the granulated product | | | Property of the shaped article—tensil, strengthe kg./mm.² |
|---|---|---|---|---|---|---|---|---|---|
| | | Liquid | Apparatus used | Temperature, °C. | | Bulk density | Particle size, Q microns | Angle of repose degrees | |
| 17 | A | Acetone | V-blender | 30 | | 0.65 | 750 | 36 | 1.2 |
| 18 | A | do | do | 45 | | 0.67 | 650 | 33 | 1.2 |
| 19 | B | Carbon tetrachloride | Kneader | 60 | | 0.63 | 680 | 31 | 1.2 |
| 20 | C | do | V-blender | 45 | | 0.58 | 700 | 35 | 1.9 |
| 21 | D | Acetone | do | 30 | | 0.60 | 730 | 37 | 1.0 |
| 22 | E | do | do | 30 | | 0.55 | 450 | 48 | 1.6 |
| 23 | F | Trichlorotrifluorethane | Kneader | 40 | | 0.67 | 500 | 33 | 1.9 |
| 24 | F | Carbon tetrachloride | Liquid layer dryer | 60 | | 0.67 | 530 | 36 | 1.9 |

We claim:

1. A method of preparing a polytetrafluoroethylene powder containing a major proportion of pearly particles having a relatively simple exterior with substantially no beard-like projections, said powder having an angle of repose of 31 to 45 degrees, the average particle size of said powder being not more than 2000 microns, which comprises stirring at a temperature of 0–200° C. in the presence of water a composition consisting of one part by weight of a polytetrafluoroethylene powder, the diameters of which particles are not more than 300 microns and 0.1–3.0 parts by weight of a water immiscible liquid having a boiling point of 30°–150° C. and a surface tension of not more than 35 dynes/cm. and capable of wetting polytetrafluoroethylene, the amount of said water being 1.5–50 parts by weight per one part by weight of said polytetrafluoroethylene and water immiscible liquid; and thereafter drying the powder to remove the water and water-immiscible liquid.

2. The method according to claim 1 wherein the amount of said liquid is in the range of 0.2–2.0 parts by weight to one part by weight of said polytetrafluoroethylene.

3. The method according to claim 1 wherein said stirring temperature ranges between 0 and 100° C.

References Cited

UNITED STATES PATENTS 3,217,083  11/1965  Gore _____ 260—92.1
3,265,679  8/1966  Black III et al. _____ 260—92.1

ALLAN LIEBERMAN, Primary Examiner

T. DE BENEDICTIS, Sr., Assistant Examiner

U.S. Cl. X.R.

260—33.2, 33.6, 33.8, 34.2, 96 R

UNITED STATES PATENT OFFICE
CERTIFICATE OF CORRECTION

Patent No. 3,781,258  Dated December 25, 1973

Inventor(s) Yutaka KOMETANI ET AL

It is certified that error appears in the above-identified patent and that said Letters Patent are hereby corrected as shown below:

IN THE HEADING:

Insert the following:

-- Claims priority, application Japan, May 18, 1964, No. 39/27644; application Japan, June 20, 1964, No. 39/35007; application Japan, June 20, 1964, No. 39/35008. --

Signed and sealed this 23rd day of April 1974.

(SEAL)
Attest:

EDWARD M.FLETCHER,JR.
Attesting Officer

C. MARSHALL DANN
Commissioner of Patents